United States Patent

Sanada et al.

[11] 3,909,834
[45] Sept. 30, 1975

[54] RANGE FINDER
[75] Inventors: Noriaki Sanada; Youichi Okuno, both of Yokohama, Japan
[73] Assignee: Canon Kabushiki Kaisha, Japan
[22] Filed: Dec. 20, 1973
[21] Appl. No.: 426,572

[30] Foreign Application Priority Data
Dec. 25, 1972 Japan.................................. 48-898

[52] U.S. Cl................................. 354/168; 354/167
[51] Int. Cl.²..................... G03B 13/20; G03B 13/22
[58] Field of Search .......... 354/163, 164, 165, 166, 354/167, 168, 169, 162

[56] References Cited
UNITED STATES PATENTS

| | | | |
|---|---|---|---|
| 2,124,885 | 7/1938 | Mihalyi | 354/163 |
| 2,273,355 | 2/1942 | Hineline | 354/167 X |
| 2,358,121 | 9/1944 | Wittel | 354/167 |
| 2,973,700 | 3/1961 | Gebele | 354/167 X |
| 2,999,416 | 9/1961 | Mische | 354/166 X |
| 3,397,606 | 8/1968 | Leety et al. | 354/166 X |

FOREIGN PATENTS OR APPLICATIONS
639,391  12/1936  Germany ........................... 354/169

*Primary Examiner*—Samuel S. Matthews
*Assistant Examiner*—E. M. O'Connor
*Attorney, Agent, or Firm*—Toren, McGeady and Stanger

[57] ABSTRACT

The present invention relates to a range finder of the double image coincidence system type consisting of a first optical system and a second optical system being in the light path, one of which being an optical system of variable image magnification consisting of a convex lens and a concave lens relatively moveable to each other. By moving the convex lens and the concave lens relatively to each other the coincidence image is formed in such a manner that the visibility and the magnification power of the first optical system and those of the second optical system can be continuously made equal to each other with the object being between infinite distance and very close distance.

10 Claims, 2 Drawing Figures

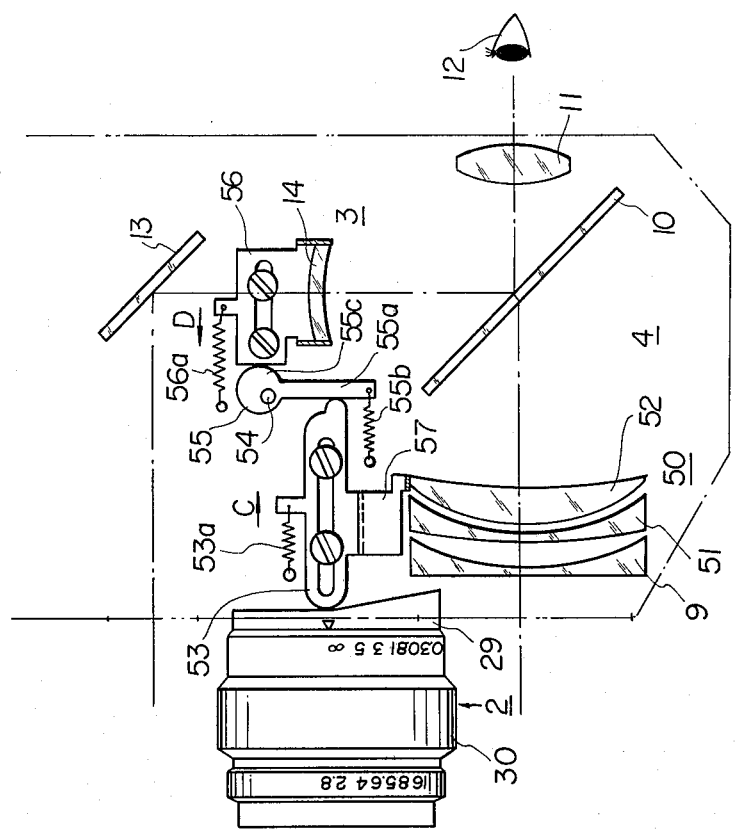
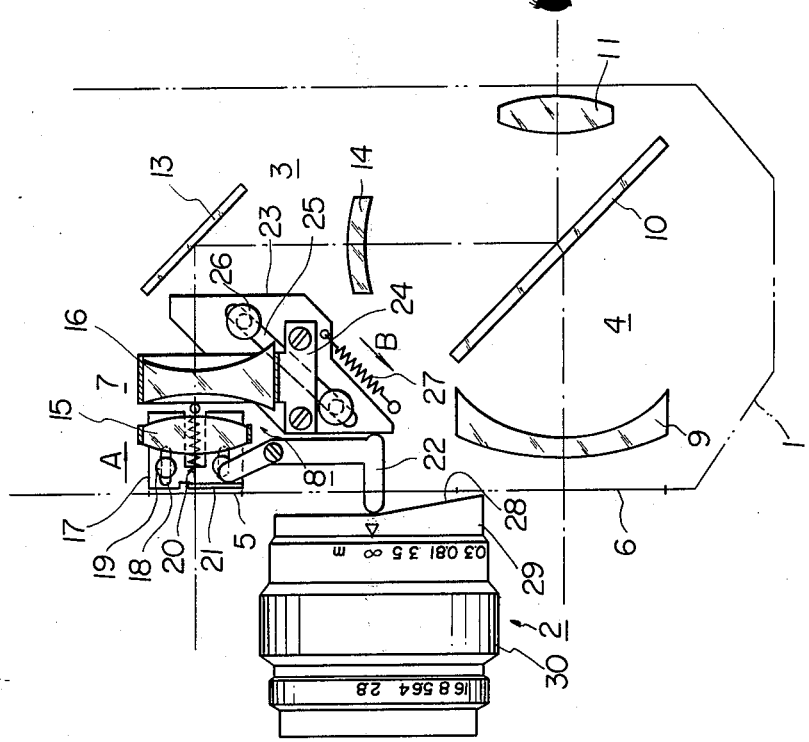

RANGE FINDER

BACKGROUND OF THE INVENTION

1. Field of the Invention

The present invention relates to a range finder suited for a photographic camera or the like.

2. Description of the Prior Art

In the conventional range finder of double image coincidence type there are two kinds, namely, the one in which the length of the light path of the first optical system and that of the second optical system are regulated so as to be equal to each other in order to measure the distance and the one in which a difference is produced between the length of the light path of the first optical system and that of the second optical system in order to measure the distance.

In case of the former system in which the lengths of the light paths of both optical systems have to be made equal to each other the number of the reflectors must be large so that many reflectors are needed. Therefore, the range finder of this system has the shortcoming that the range finder itself becomes overly large so that its portability and operationality become inferior.

On the other hand, in the latter system in which a difference is produced between the lengths of the light paths of both optical systems, there is no need to make equal the lengths of the light paths of both optical systems and therefore the number of the reflection can be made small so that the number of the reflectors can be reduced. Thus the range finder of this system has the advantage that the range finder can be made compact so that the portability and the operationality become superior. The difference which is produced between the lengths of the light paths of both optical systems is so small as to be neglected when the object is at far or infinite distance, but can not be neglected when the object is very close. Namely when the object is very close, there is such a difference between the magnification powers of both optical systems that it becomes impossible to measure the distance. In contrast, the image formed by the first optical system and that formed by the second optical system are equal to each other when the object is at far distance or at infinite distance so that it is possible to measure the distance.

In order to eliminate the above mentioned shortcoming such a device as disclosed in the utility model application Sho 45-25415 has been proposed. Nevertheless the device according to the above mentioned utility model application is an accessory device device which has to be mounted on the photographing camera every time when it is used so that the appliance is very inconvenient. Because further it is not a subsidiary device which can be adapted continuously, many subsidiary devices have to be kept ready and a device which is suited for taking photographs at close distance in order to measure the distance must be replaced by other devices when many a particular photographs have to be taken at various close distances.

The first purpose of the present invention is to eliminate the above mentioned shortcoming by providing an optical system of variable image magnification in the light path of the first optical system and/or that of the second optical system.

The second purpose of the present invention is to make the visibility and the magnification power of the first optical system and those of the second optical system continuously equal to each other for the object between the infinite distance and the very close distance.

The third purpose of the present invention is to realize a range finder which can easily be built in the photographing camera itself.

The fourth purpose of the present invention is to make it possible to form a coincidence image in functional connection with the distance ring on the photographing camera.

BRIEF DESCRIPTION OF THE DRAWINGS

FIG. 1 shows the first embodiment of the present invention built in a photographing camera.

FIG. 2 shows the second embodiment of the present invention built in a photographing camera.

DESCRIPTION OF THE PREFERRED EMBODIMENTS

The present invention will be explained according to FIG. 1 showing the first embodiment of the present invention. In FIG. 1, 1 is the photographing camera body, on the front face of which a photographing lens 2 is provided, whereby in the neighborhood of both ends of this photographing lens 2 the light admitting window 5 of the first optical system 3 as light deflection optical system and the light admitting window 6 of the second optical system 4 as finder optical system are provided with a certain determined distance between each other. Behind the first light admitting window 5 of the first optical system 3 an image enlarging optical system 7 as optical system of variable image magnification is provided. On this image enlarging optical system 7, an operation mechanism 8 is provided in such a manner that the image enlarging optical system 7 is moved in functional connection with the advance of the photographing lens 2. The second optical system 4 consists of the second objective 9, the obliquely provided half transparent mirror 10 and the eyepiece 11, whereby the light coming from the second light admitting window 6 is observed by the photographer through the objective 9, the half transparent mirror 10 and the eyepiece. The first optical system consists of the obliquely provided mirror 13, the first objective 14, the above mentioned half transparent mirror 10 and the eyepiece 11. The light coming from the first light admitting window is, after having passed the image enlarging optical system 7, reflected by the mirror 13, passes the first objective 14, is reflected again by means of the half transparent mirror 10, and reaches the eye 12 of the photographer through the eyepiece 11. The image enlarging optical system 7 consists of the convex lens 15 and the concave lens 16 located at the side of the first light admitting window 5, whereby they are designed in such a manner that the magnification power of both lenses 15 and 16 is ± zero when the both lenses 15 and 16 become one body. The convex lens 15 and the concave lens 16 are so designed as to be moveable by means of the operation mechanism 8. Namely the concave lens 15 is fixed by means of the holding plate 17, which plate is mounted moveable with reference to the photographing camera body 1 by means of a long hole 18 provided on the holding plate 17 and a pin, whereby the holding plate 17 is pushed along the direction of an arrow A in the drawing by means of a spring 20. Further, on the holding plate 17 an engaging piece 21 is provided, with which engaging piece 21 the one end of an almost L-shaped lever 22 pivoted almost at the center engages.

The concave lens 16 is fixed firmly on the support plate 24 which, in turn, is also fixed firmly on the holding plate 23, whereby the holding plate 23 is mounted moveable with reference to the photographing camera body by means of the guide groove provided obliquely on the holding plate 23 and the pin and is further pushed along the direction of an arrow B in the drawing by means of the spring 27. With the one end of the holding plate 23, the other end of the above mentioned lever 22 engages. When the lever 22 is moved along the anticlockwise direction, the convex lens 15 composing one body with the holding plate 17 and the concave lens 16 composing one body with the holding plate 23 are moved along the direction contrary to the arrow A and the direction contrary to the arrow B against the strength of the spring 20 and the strength of the spring 27, whereby the dimension and the visibility of the image formed by the first optical system 3 are adjusted so as to be equal to the dimension and the visibility of the image formed by the second optical system 4. The magnification power of the image can be varied by varying the distance between the convex lens and the concave lens which are arranged opposite to each other, while the visibility can be adjusted by moving the convex lens and the concave lens backward and forward. Thus, the visibility and the magnification power of the image can at the same time be adjusted by constructing both the convex lens 15 and the concave lens 16 moveable. Further to move the concave lens 16 obliquely to the right, namely along the direction contrary to the arrow B, is to make the image formed by the first optical system 3 coincide with the image formed by the second system 4. At the rear end of the photographing lens 2', a cam 29 presenting an inclined part 28 is provided so as to be in functional relation with the distance ring 30, whereby on the inclined part 28 of the cam, the other end of the above mentioned lever 22 moves in such a manner that when a distance ring 30 presenting for example an adjustable range between infinite distance and 0.3 m is rotated so as to be set at a certain set value, the cam 29 is also rotated in functional relation so as to rotate the lever 22 along the anticlockwise direction by a certain amount corresponding to the set value by means of the inclined part 28.

The operation of the above mentioned mechanism will be explained later, whereby at first the photographing at close distance will be explained. When at first the distance ring 30 is rotated from the infinite distance for example, down to 0.8 m, the cam 29 is also rotated in functional relation so as to rotate the lever 22 along the anticlockwise direction, pushing the other end of the lever 22 by means of the inclined part. Thus, the engaging piece 21, by being pushed by the one end of the lever 22, the holding plate 17 is moved along the direction contrary to the arrow A in the drawing against the strength of the spring 20. In this manner, the convex lens 15 is also moved together with the holding plate 17. At the same time the one end of the holding plate 23 is pushed by the other end of the lever 22 and moved along the direction contrary to the arrow B in the drawing against the strength of the spring 27. In this way the convex lens 15 and the concave lens 16 can be made moveable according to the set value of 0.8 m of the distance ring 30, while the distance between the convex lens 15 and the concave lens 16 is enlarged so that the dimension and the visibility of the image formed by the first optical system 3 become equal to the dimension and the visibility of the image formed by the second optical system 4 while the both images coincide with each other.

When the distance ring 30 is rotated so as to be set for example at 0.3 m from 0.8 m, the cam 29 is further rotated in functional relation, whereby the other end of the lever 22 is pushed by the inclined part 28 so as to be rotated along the anticlockwise direction. Thus the holding plates 17 and 23 are similarily moved along the direction contrary to the arrow A in the drawing and the direction contrary to the arrow B in the drawing against the strength of the spring 20 and the strength of the spring 27. In this way the convex lens 15 and the concave lens 16 are moved according to the set value of 0.3 m of the distance ring 30 while the distance between both lenses are enlarged, so that the dimension and the visibility of the image formed by the first optical system 3 become equal to the dimension and the visibility of the image formed by the second optical system 4 while both images are made to coincide with each other.

Nextly the photographing at long distance or at infinite distance will be explained below. The distance ring 30 is set for example at infinite distance ∞ from 0.3 m, whereby the cam 29 is rotated along the reverse direction as mentioned above in functional relation to the movement of the distance ring in such a manner the pressure working on the other end of the lever 22 by the inclined part 28 is released. At the same time the pressure working upon the holding plate 17 by the one end of the lever 22 and that working upon the holding plate 23 by the other end of the lever 22 are also released, so that the holding plates 17 and 23 are moved along the directions of the arrows A and B in the drawing by the strength of the springs 20 and 27 while at the same time the lever 22 is rotated along the clockwise direction. In this way the convex lens 15 and the concave lens 16 are made moveable while the distance between both lenses are made smaller until both lenses come into contact with each other in such a manner that the magnification of both lenses is reduced to zero. Thus the magnification and the visibility of the image formed by the first optical system 3 are not adjusted by the image enlarging optical system 7 and the dimension and the visibility of the image formed by the first optical system 3 are made equal to the dimension and the visibility of the image formed by the second optical system 4, while both images are made to coincide with each other.

Therefore by carrying out the above mentioned operation according to the set value of the distance ring 30, the convex lens 15 and the concave lens 16 of the image enlarging optical system 7 are moved in functional relation to the advance of the distance ring 30 of the photographing lens 2 for the range covering from the infinite distance down to the very close distance in such a manner that the dimension and the visibility of the image formed by the first optical system 3 are continuously made equal to the dimension and the visibility of the image formed by the second optical system 4, while both images are made coincide with each other.

Although in the above mentioned embodiment the image enlarging optical system 7 as optical system of variable image magnification is provided in the light path of the first optical system 3, the present invention is not necessarily limited to the embodiment, whereby it is also possible to provide an image reducing optical system 50 as an optical system of variable image magnification in the light path of the second optical system 4 as is shown in FIG. 2. Accordingly, by operating the image reducing optical system, the magnification power and the visibility of the image formed by the second optical system 4 is made continuously equal to the magnification power and the visibility of the image formed by the first optical system 3 while both images are made to coincide with each other. In FIG. 2, 50 is the image reducing optical system provided in the light path of the second optical system 4, which consists of a concave lens 51 and a convex lens 52. The convex lens 52 is supported by the support plate 57, which is moveable by sliding together with the slide plate 53. The slide plate 53 is pushed along the direction contrary to the arrow C in the drawing by means of the spring 53a in such a manner that the one end of the slide plate 53 is in touch with the cam of the distance ring 30, while the other end of the slide plate 53 is in touch with the arm 55a of the member 55 rotatable around the shaft 54 as center. The rotatable member 55 is pushed along the clockwise direction by means of the spring 55b, whereby the base part 55c is in touch with the holding member 56 of the first objective 14. The holding member 56 is pushed along the direction of the arrow D by means of the spring 56a. The slide plate 53 is moved according to the adjustment of the distance ring 30, whereby the rotatable member 55 is rotated around the shaft 54 as center so as to move the holding member 56 to decide the position of the first objective 14. At the same time the distance between the convex lens 52 and the concave lens 51 is determined. In this way the magnification power and the visibility of the image formed by the optical system 3 are continuously made equal to the magnification power and the visibility of the image formed by the optical system 4, while both images are made to coincide with each other. Hereby it is also possible to make the mirror 13 rotatable, although in the above case the first objective is made moveable for operating the range finder.

Further according to the present invention it is possible to provide the image enlarging optical system in the light path of the first optical system 3 and further the image reducing optical system in the light path of the second optical system 4 in such a manner that by operating the image enlarging optical system and the image reducing optical system the magnification power and the visibility of the image formed by the first optical system 3 and the magnification power and the visibility of the image formed by the second optical system 4 are made continuously equal to each other while both of the images are made coincide with each other.

As so far explained in detail according to the present invention, optical systems of variable image magnification consisting of a convex lens and a concave lens mutually moveable with each other in the light path of the first optical system and/or in the light path of the second optical system, whereby by moving the convex lens as well as the concave lens the visibility and the magnification power of the first optical system is made equal to the visibility and the magnification power of the second optical system for the range covering from the infinite distance down to the very close distance, while a coincidence image is obtained. In this way it is possible to offer a range finder which can easily be built into the photographing camera body because optical systems of variable image magnification have only to be provided in the light paths of optical systems.

What is claimed is:

1. A range finder of the double image coincidence type comprising:
   a finder optical system for providing an image of an object;
   a deflection optical system for providing an image of an object, said system having the length of the associated light path from an object whose distance is to be measured being different from the length of the associated light path from said object in said finder optical system;
   means for displacing said deflection optical system for adjusting the image of the deflection optical system to be coincident with the image of said finder optical system;
   means for providing variable image magnification being arranged in at least one of the light paths of said finder optical system, and said deflection optical system, said variable image magnification means including an optical system having positive and negative elements; and
   means for varying the relative distance between said positive optical element and negative optical element, said means operating in conjunction with said image coincidence means, whereby said variable image magnification equalizes the image sizes of said finder optical system and said deflection optical system.

2. The range finder of claim 1, wherein said positive optical element and said negative optical element in said variable image magnification means are arranged so that the magnification power is reduced to ±0 when both elements are in the closest proximity to each other.

3. The range finder of claim 1, wherein the means for providing variable image magnification is an image enlarging optical system disposed in the light path of said deflection optical system.

4. The range finder of claim 3, wherein said image coincidence means is provided with means for eccentrically orienting the positive or the negative optical element in the variable magnification means.

5. The range finder of claim 1, wherein the means for providing variable image magnification is an image reducing optical system disposed in the light path of the finder optical means.

6. The range finder of claim 1, wherein the positive and negative optical elements are a convex and a concave lens, respectively.

7. A range finder of the double image coincidence type comprising:
   a finder optical system for providing an image of an object;
   a deflection optical system for providing an image of an object, said deflection system having the length of the associated light path from the object whose distance is to be measured being different from the length of the associated light path from the object in said finder optical system, said deflection system including positive and negative optical elements in the light path of the deflection optical system, said elements adapted for relative movement with respect to each other for providing variable image magnification;

means for displacing said deflection optical system for adjusting the image of the deflection optical system to be coincident with the image of said finder optical system; and means for varying the distance between said positive optical element and negative element, said means operating in conjunction with said image coincidence means to effect image equalization of said finder optical system and said deflection optical system.

8. A range finder of the double image coincidence type comprising:

a finder optical system for providing an image of an object, said system including positive and negative optical elements being disposed in the light path of said optical deflection system, said elements adapted for relative movement with respect to each other for providing variable image magnification;

a deflection optical system for providing an image of an object, said deflection system having the length of the associated light path from said object whose distance is to be measured being different from the length of the associated light path from the object in said finder optical system;

means for displacing at least a portion of said deflection optical system for adjusting the image of the deflection optical system to be coincident with the image of said finder optical system; and means for varying the distance between said positive optical element and negative element, said means operating in conjunction with said image means to effect image equalization of said finder optical system and said deflection optical system.

9. In a camera having a built-in range finder of the double image coincidence type, the improvement comprising:

a finder optical system for providing an image of an object;

a deflection optical system for providing an image of an object, said deflection system having the length of the associated light path from said object whose distance is to be measured being different from the length of the associated light path from the object in said finder optical system;

means for displacing said deflection optical system for adjusting the image of the deflection optical system to be coincident with the image of said finder optical system;

means for providing variable image magnification being arranged in at least one of the light paths of said finder optical system and said deflection optical system, said variable image magnification means including an optical system having positive and negative elements;

a first means for varying the distance between said positive and negative optical elements;

a second means for displacing said positive optical element simultaneously with said negative optical elements; and a photographic lens having a distance setting ring including means for actuating said image coincidence means and said first and second means for moving said optical elements, whereby said variable image magnification equalizes the image sizes of said finder optical system and said deflection optical system.

10. The camera of claim 9, wherein said deflection optical system is provided with an objective lens, said objective lens being subject to being eccentrically moved by said image coincidence means.

* * * * *